United States Patent
Chiu et al.

(10) Patent No.: US 9,967,139 B2
(45) Date of Patent: May 8, 2018

(54) REMOTE ZONE MANAGEMENT OF JBOD SYSTEMS

(71) Applicant: Quanta Computer Inc., Taoyuan (TW)

(72) Inventors: Yang-Li Chiu, Taoyuan (TW); Tsu-Tai Kung, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 237 days.

(21) Appl. No.: 14/969,472

(22) Filed: Dec. 15, 2015

(65) Prior Publication Data

US 2017/0171023 A1 Jun. 15, 2017

(51) Int. Cl.
| | |
|---|---|
| *G06F 15/177* | (2006.01) |
| *H04L 12/24* | (2006.01) |
| *G06F 13/42* | (2006.01) |
| *G06F 17/30* | (2006.01) |
| *H04L 29/06* | (2006.01) |
| *H04L 29/08* | (2006.01) |

(52) U.S. Cl.
CPC ...... *H04L 41/0806* (2013.01); *G06F 13/4282* (2013.01); *G06F 17/30914* (2013.01); *G06F 17/30952* (2013.01); *H04L 63/10* (2013.01); *H04L 63/20* (2013.01); *H04L 69/329* (2013.01)

(58) Field of Classification Search
CPC ..... H04L 41/0806; H04L 63/20; H04L 63/10; H04L 69/329; G06F 17/30914; G06F 17/30952; G06F 13/4282
See application file for complete search history.

(56) References Cited

U.S. PATENT DOCUMENTS

| | | | | |
|---|---|---|---|---|
| 9,098,395 | B2* | 8/2015 | Yeh | G06F 12/0246 |
| 9,639,475 | B2* | 5/2017 | Tan | |
| 2004/0078599 | A1* | 4/2004 | Nahum | G06Q 30/04 726/29 |
| 2009/0094620 | A1* | 4/2009 | Kalwitz | G06F 11/2089 719/325 |
| 2013/0238930 | A1* | 9/2013 | Umbehocker | G06F 11/2092 714/6.32 |
| 2014/0115087 | A1* | 4/2014 | Nakajima | H04L 67/1097 709/212 |
| 2017/0083451 | A1* | 3/2017 | Tan | G06F 12/0246 |

* cited by examiner

*Primary Examiner* — Richard G Keehn
(74) *Attorney, Agent, or Firm* — Nixon Peabody LLP; Eduardo J. Quinones; Zhou Lu

(57) ABSTRACT

Various examples of the present technology provide a method for remotely controlling zone management of a storage system that comprises generating and initializing a network service for a remote device and a new thread for handing commands from the remote device, determining, for each port of a plurality of ports associated with storage devices of a storage system, a corresponding zone group based at least upon zone IDs of the plurality of ports, setting a zoning configuration parameter corresponding to each group of the plurality of zoning groups using a serial protocol (e.g., SAS management protocol (SMP)), and configuring a zone and port mapping table and a zone permission table based at least upon the zoning configuration parameter.

20 Claims, 5 Drawing Sheets

REMOTE ZONE MANAGEMENT OF JBOD SYSTEMS

TECHNICAL FIELD

The present technology relates generally to zone management of a storage system in a telecommunications network.

BACKGROUND

Modern server farms or datacenters typically employ a large number of servers to handle processing needs for a variety of application services. Each server handles various operations and requires a certain level of storage capacity to handle these operations. For server systems, it is relatively easy to add storage capacity in Just a Bunch of Disks (JBOD) systems. The JBOD system can be a collection of disk drives contained in a single drive enclosure.

However, zone management of JBOD systems can be tedious and is typically accomplished by executing a serial attached SCSI (SAS) protocol function in a universal asynchronous receiver/transmitter (UART) console system. A user or operator needs to be present at the JBOD systems to perform the zone management. Thus, there is a need to perform the zone management of the JBOD systems remotely.

SUMMARY

Systems and methods in accordance with various examples of the present technology provide a solution to the above-mentioned problems by combining a network protocol and a SAS management protocol function to control zone management of a storage system (e.g., a JBOD). More specifically, various examples of the present technology provide methods for remotely controlling zone management of a storage system by generating and initializing a network service for a remote device and a new thread for handing commands from the remote device, determining, for each port of a plurality of ports associated with storage devices of a storage system, a corresponding zone group based at least upon zone IDs of the plurality of ports, setting a zoning configuration parameter corresponding to each group of the plurality of zoning groups using a serial protocol (e.g., SAS management protocol (SMP), serial SCSI protocol (SSP), or serial ATA tunneled protocol (STP)), and configuring a zone and port mapping table and a zone permission table based at least upon the zoning configuration parameter. Hardware and memory initiation of the storage system can then be performed based at least upon the zone and port mapping table and the zone permission table.

In some examples, a network service on a storage system is configured to provide a virtual terminal connection and can be generated via an application layer protocol (e.g., a Telnet protocol). For example, user data or command can be interspersed in-band with Telnet control information in an n-bit byte-oriented data connection over a transmission control protocol (TCP).

Some examples provide a means of interaction between a remote device and a storage system using a command-line interface (CLI) where the remote device or a user can input commands in a form of successive lines of text. The CLI includes, but is not limited to, a digital command language (DCL) interface, Unix shell, control program interface for microcomputers (CP/M), command com interface, cmd.exe interface, and resource time sharing system (RSTS) interface. In some examples, the remote device or user can login onto a CLI of the storage system and using an application layer protocol to input zone IDs of the plurality of ports associated with storage devices of the storage system via the CLI.

In response to determining that a first zoning command received from a remote device is not supported on a storage system, some examples receive a second zoning command associated with the storage devices of the storage system to yield the first zoning command. In some examples, an option can be provided for a remote device or user to replace a default CLI generated by the storage system. For example, the option can be a 4DOS for a disk operating system (DOS), 4OS2 for an OS/2 operating system, and take-command for a Window operating system.

In some examples, a zone and port mapping table and a zone permission table are configured for providing an exclusive access control of storage devices of a storage system. A plurality of zone groups is defined based at least upon zone IDs of a plurality of ports associated with the storage devices of the storage system. Each port of the plurality of ports can be assigned to a specific zone group of the plurality of zone group. Computer or server systems that are connected to ports belonging to different zone groups may not recognize each other to prevent illegal disk access.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION

Various examples of the present technology provide systems and methods for remotely controlling zone management of a storage system. In some examples, methods for remotely controlling zone management of a storage system that comprise generating and initializing a network service for a remote device and a new thread for handing commands from the remote device, determining, for each port of a plurality of ports associated with storage devices of a storage system, a corresponding zone group based at least upon zone IDs of the plurality of ports, setting a zoning configuration parameter corresponding to each group of the plurality of zoning groups using a serial protocol (e.g., SAS management protocol (SMP)), and configuring a zone and port mapping table and a zone permission table based at least upon the zoning configuration parameter.

Figure 1:
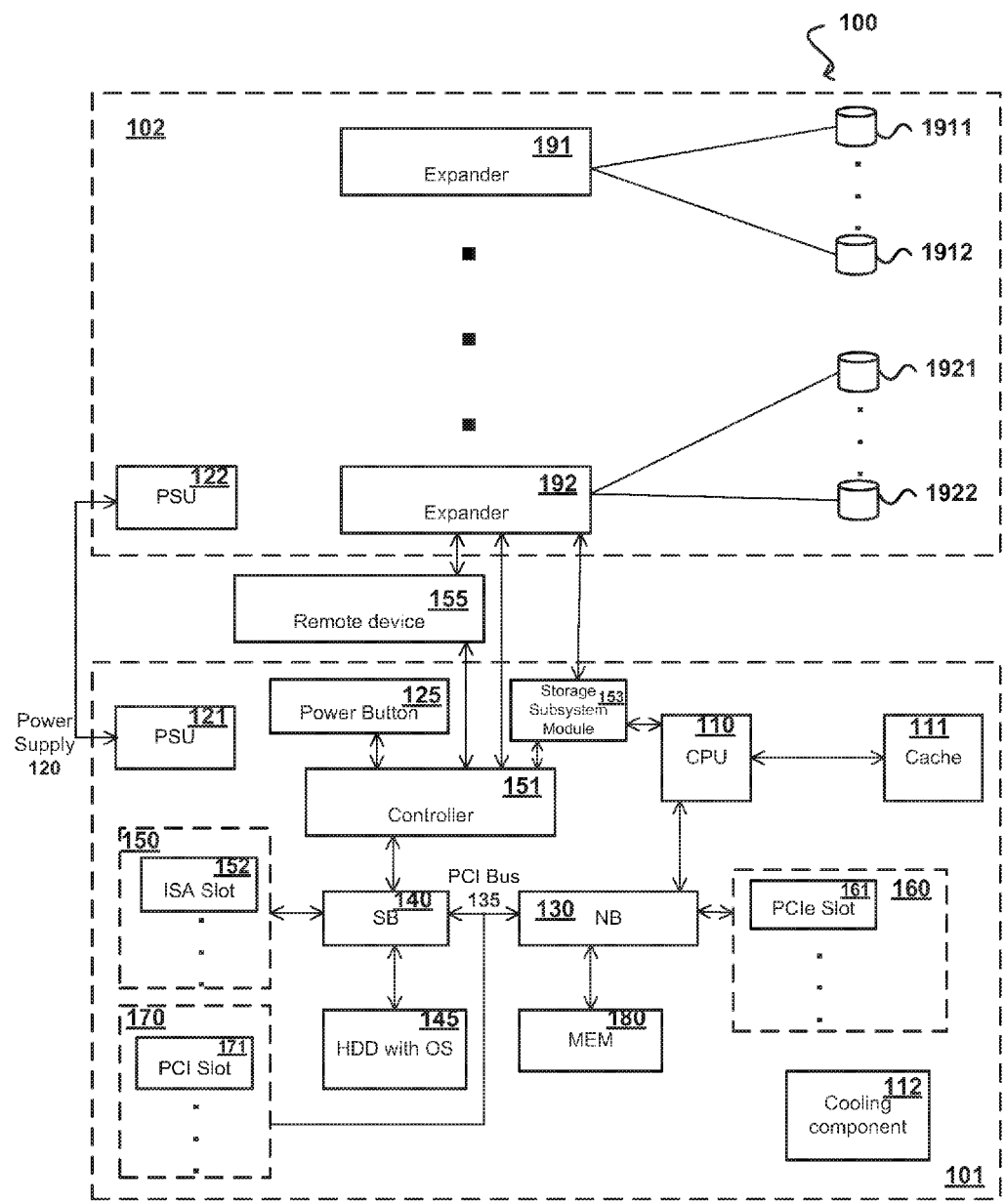
FIG. 1 illustrates a schematic block diagrams of an exemplary system containing a storage subsystem and a server system in accordance with an implementation of the present technology.

FIG. 1 illustrates a schematic block diagram of an exemplary system 100 containing a storage subsystem 102 and a server system 101 in accordance with an implementation of the present technology. In this example, the server system 101 comprises at least one microprocessor or CPU 110 connected to a cache 111, one or more cooling components 112, a main memory (MEM) 180, at least one power supply unit (PSU) 121 that receives an AC power from a power supply 120 and provides power to the server system 101. The storage subsystem 102 comprises one or more PSUs 122 that receive an AC power from the power supply 120 and provides power to the storage subsystem 102, at least one expander (e.g., expanders 191 and 192), and a plurality of storage devices (e.g., 1911, 1912, 1921 and 1922). The storage devices may include at least one of SCSI (SAS) disk, a serial ATA (SATA) disk, or a solid state drive (SSD). The storage devices may be individual storage devices or may be arranged in a RAID (Redundant Array of Independent Disks). Each of the at least one expander is configured to manage one or more storage devices of the storage subsystem 102 (e.g., receiving commands and routing them to the corresponding storage devices) and communicate with a remote device over a network, a management module, and other expanders of the storage subsystem 102. The commands may include read or write commands, information requests, or management commands (e.g., zoning commands). The command can be in a format of text, small computer system interface (SCSI), AT attachment (ATA), or serial ATA (SATA). In this example, the expander 191 is configured to manage the storage devices 1911 and 1912, while the expander 192 is configured to manage the storage devices 1921 and 1922.

In this example, the at least one expander (e.g., expanders 191 and 192) can also provide a command-line interface (CLI) between a remote device 155 and the storage subsystem 102. The remote device 155 or remote user can input commands via the CLI. The CLI includes, but is not limited to, digital command language (DCL), various Unix shells, control program for microcomputers (CP/M), command com, cmd.exe, and resource time sharing system (RSTS) CLI. The remote device 155 or remote user can login onto a CLI of the storage subsystem 102 and using an application layer protocol and input zone IDs of a plurality of ports associated with the plurality of storage devices (e.g., 1911, 1912, 1921 and 1922) of the storage subsystem 102 via the CLI.

In some implementations, the expanders of the storage subsystem 102 are connected to the plurality of storage devices in the storage subsystem 102 with connection redundancy to protect against a failed communication link (e.g., a failed cable or port, or accidentally unplugged connection). In some implementations, the storage subsystem 102 and the server system 101 can be configured on a single rack or different server racks.

The at least one PSU 121 is configured to supply power to various components of the server system 101, such as the CPU 110, cache 111, NB logic 130, PCIe slots 160, Memory 180, SB logic 140, storage device 145, ISA slots 150, PCI slots 170, and controller 151. After being powered on, the server system 101 is configured to load software application from memory, computer storage device, or an external storage device to perform various operations. The hard drive 145 is structured into logical blocks that are available to an operating system and applications of the server system 101 and configured to retain server data even when the server system 101 is powered off. The one or more PSUs 122 are configured to supply powers to various component of the storage subsystem 102, such as the plurality of storage devices, the at least one expander, and one or more cooling components (not shown).

The main memory 180 can be coupled to the CPU 110 via a north bridge (NB) logic 130. A memory control module (not shown) can be used to control operations of the memory 180 by asserting necessary control signals during memory operations. The main memory 180 may include, but is not limited to, dynamic random access memory (DRAM), double data rate DRAM (DDR DRAM), static RAM (SRAM), or other types of suitable memory.

In some implementations, the CPU 110 can be multi-core processors, each of which is coupled together through a CPU bus connected to the NB logic 130. In some implementations, the NB logic 130 can be integrated into the CPU 110. The NB logic 130 can also be connected to a plurality of peripheral component interconnect express (PCIe) slots 160 and a south bridge (SB) logic 140. The plurality of PCIe slots 160 can be used for connections and buses such as PCI Express x1, USB 2.0, SMBus, SIM card, future extension for another PCIe lane, 1.5 V and 3.3 V power, and wires to diagnostics LEDs on the server's chassis.

In this example, the NB logic 130 and the SB logic 140 are connected by a peripheral component interconnect (PCI) Bus 135. The PCI Bus 135 can support function on the CPU 110 but in a standardized format that is independent of any of CPU's native buses. The PCI Bus 135 can be further connected to a plurality of PCI slots 170 (e.g., a PCI slot 171). Devices connect to the PCI Bus 135 may appear to a bus controller (not shown) to be connected directly to a CPU bus, assigned addresses in the CPU 110's address space, and synchronized to a single bus clock. PCI cards can be used in the plurality of PCI slots 170 include, but are not limited to, network interface cards (NICs), sound cards, modems, TV tuner cards, disk controllers, video cards, small computer system interface (SCSI) adapters, and personal computer memory card international association (PCMCIA) cards.

The SB logic 140 can couple the PCI bus 135 to a plurality of expansion cards or slots 150 (e.g., an ISA slot 152) via an expansion bus. The expansion bus can be a bus used for communications between the SB logic 140 and peripheral devices, and may include, but is not limited to, an industry standard architecture (ISA) bus, PC/104 bus, low pin count bus, extended ISA (EISA) bus, universal serial bus (USB), integrated drive electronics (IDE) bus, or any other suitable bus that can be used for data communications for peripheral devices.

In the example, the SB logic 140 is further coupled to a controller 151 that is connected to the at least one PSU 121. In some implementations, the controller 151 can be a baseboard management controller (BMC), rack management controller (RMC), or any other suitable type of system controller. The controller 151 is configured to control operations of the at least one PSU 121 and/or other applicable operations. In some implementations, the controller 151 is configured to monitor processing demands, and components and/or connection status of the server system 101.

In this example, the controller 151 is connected to the at least one expander (e.g., expanders 191 and 192) of the storage subsystem 102 via a cable or wireless connection (e.g., I2C, SMBus, or PCIe).

Although only certain components are shown within the exemplary system 100 in FIG. 1, various types of electronic or computing components that are capable of processing or storing data, or receiving or transmitting signals can also be included in the exemplary system 100. Further, the electronic or computing components in the exemplary system 100 can be configured to execute various types of application and/or can use various types of operating systems. These operating systems can include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

Depending on the desired implementation for the exemplary system 100, a variety of networking and messaging protocols can be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, the exemplary system 100 illustrated in FIG. 1 is used for purposes of explanation. Therefore, a network system can be implemented with many variations, as appropriate, yet still provide a configuration of network platform in accordance with various examples of the present technology.

In exemplary configurations of FIG. 1, the server system 101 and or storage subsystem 102 can also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art. Various other elements and/or combinations are possible as well within the scope of various examples.

The above discussion is meant to be illustrative of the principles and various examples of the present technology. Numerous variations and modifications will become apparent once the above disclosure is fully appreciated.

Figure 2A:
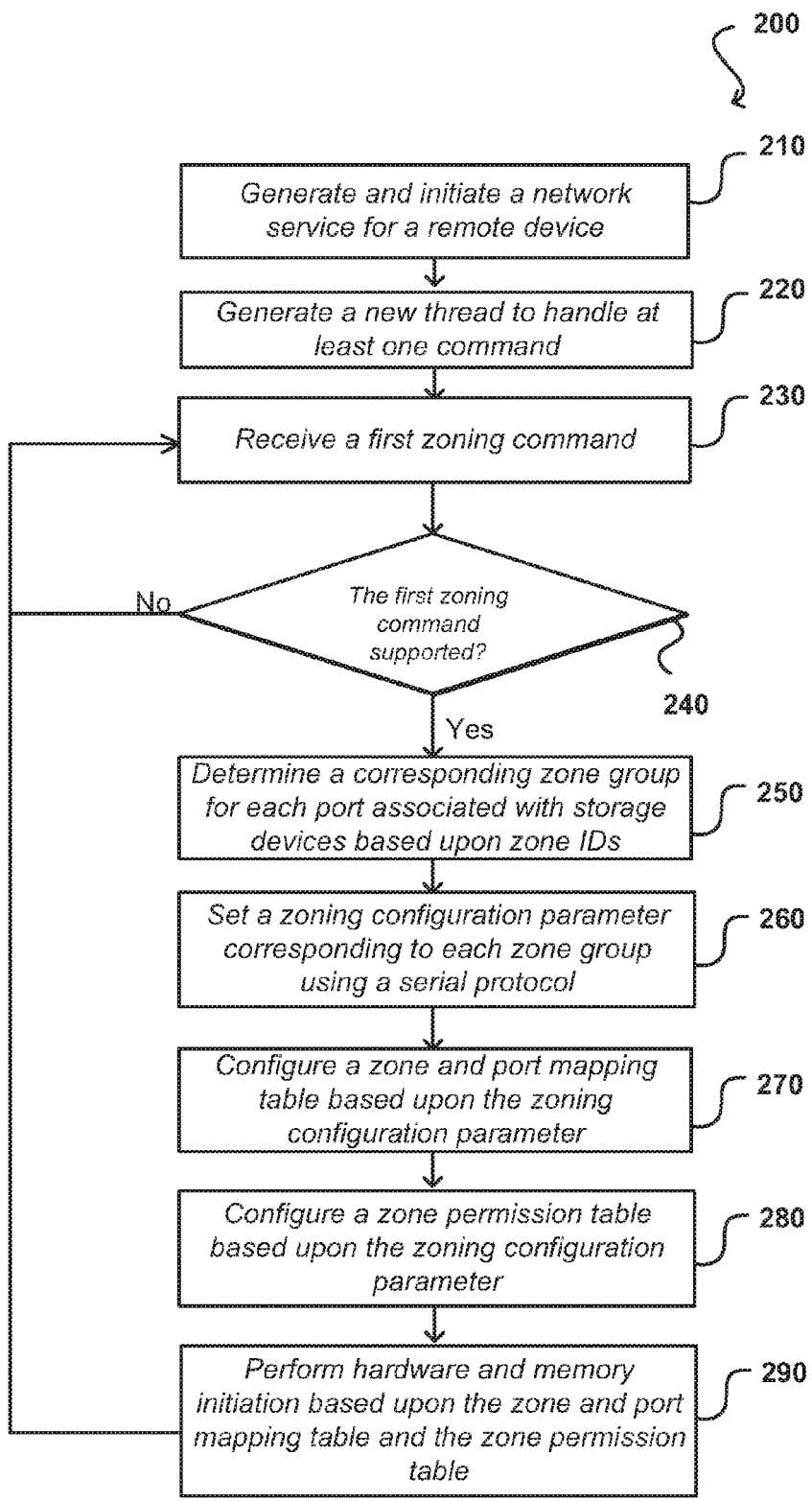
FIGS. 2A, 2B and 2C illustrate exemplary methods for remote zone management of a storage system in accordance with an implementation of the present technology.

FIG. 2A illustrates an exemplary method 200 for remote zone management of a storage system in accordance with an implementation of the present technology. It should be understood that the exemplary method 200 is presented solely for illustrative purposes and that in other methods in accordance with the present technology can include additional, fewer, or alternative steps performed in similar or alternative orders, or in parallel. The exemplary method 200 starts with generating and initiating a network service on the storage system (e.g., as illustrated in FIG. 1) for a remote device, at step 210. The network service is configured to provide a virtual terminal connection to the storage system and can be generated via an application layer protocol.

At step 220, a new thread is generated on the network service to handle at least one command from the remote device, as illustrated in FIG. 1. In some examples, a means for the remote device to interact with the storage system is a command-line interface (CLI). The remote device or a user can input command on the CLI in a form of text. In some examples, the remote device or user can login onto a CLI of the storage system and use a Telnet protocol to input commands (e.g., zoning commands) and/or zone IDs of a plurality of ports associated with storage devices of the storage system.

At step 230, a first zoning command associated with the storage device of the storage system is received from the remote device. In some examples, the first zoning command may include a zone ID for each of a plurality of ports associated with the storage devices of the storage system. In response to determining that the first zoning command is supported on the storage system, a corresponding zone group of a plurality of zone group can be determined for each port of the plurality of ports, at step 250. In response to determining that the first zoning command is not supported on the storage system, the exemplary method 200 goes back to step 230 for receiving a second zoning command associated with the storage devices of the storage system to yield the first zoning command.

At step 250, a corresponding zone group can be determined for each port of the plurality of ports associated with the storage devices of the storage system. A zoning configuration parameter can be set for each zone group of the plurality of zone groups, at step 260. The plurality of zone groups can be defined based at least upon zone IDs of the plurality of ports associated with the storage devices of the storage system. Servers connected to ports belonging to different zone groups may not recognize each other and have access to storage devices that are not assigned in a same zone group.

At step 270, a zone and port mapping table can be configured based upon the zoning configuration parameter. At step 280, a zone permission table can be configured based upon the zoning configuration parameter. Hardware and software initiation can be performed on the storage system based at least upon the zone and port mapping table and the zone permission table, at step 290.

Figure 2B:
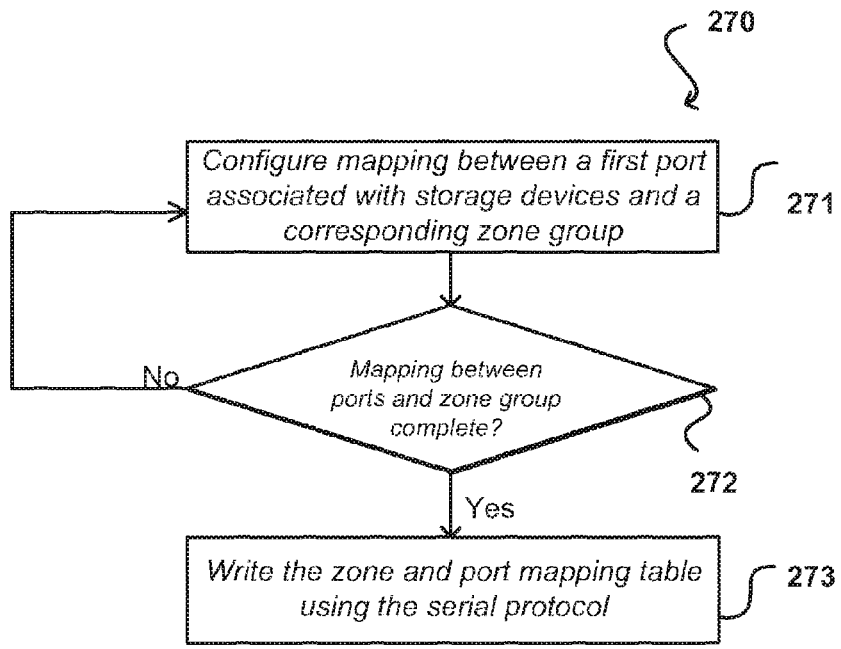

FIG. 2B illustrates an exemplary method step 270 of configuring the zone and port mapping table in accordance with an implementation of the present technology. The exemplary method step 270 starts with configuring mapping between a first port associated with the storage devices of the storage system and a corresponding zone group of the plurality of zone groups. In some examples, configuring the mapping can be performed by a controller or an expander of the storage system, for example, the controller 151, expanders (e.g., 191 and 192), or the storage subsystem module 153 as illustrated in FIG. 1.

At step 272, a determination can be made whether mappings between the plurality of ports and the plurality of zone groups are completed. In some implementations, the determination can be made by a controller or an expander of the storage system, as illustrated in FIG. 1. In response to determining that mappings are completed, the zone and port mapping table can be written on the storage system using the serial protocol to yield a previous version, at step 273. In response to determining that mappings are not completed, the exemplary method step 270 goes back to the step 271.

Figure 2C:
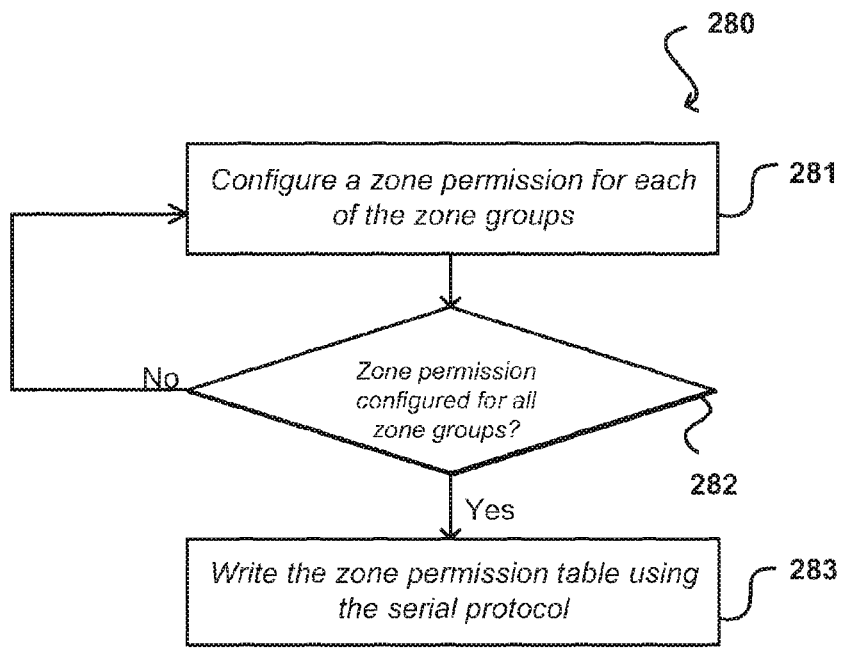

FIG. 2C illustrates an exemplary method step 280 of configuring the zone permission table in accordance with an implementation of the present technology. The exemplary method step 280 starts with configuring a zone permission for each zone group of the plurality of zone groups associated with the storage devices of the storage system. In some examples, configuring the zone permission table can be performed by a controller or an expander of the storage system, for example, the controller 151, expanders (e.g., 191 and 192), or the storage subsystem module 153 as illustrated in FIG. 1.

At step 282, a determination can be made whether zone permission is configured for each zone group of the plurality of zone groups. In some implementations, the determination can be made by a controller or an expander of the storage system, as illustrated in FIG. 1. In response to determining that mappings zone permission is configured for each zone group of the plurality of zone groups, the zone permission table can be written on the storage system using the serial protocol to yield a previous version, at step 283. In response to determining that zone permission is not configured for each zone group of the plurality of zone groups, the exemplary method step 280 goes back to the step 281.

Terminologies

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks can be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments, networks, devices, ports, physical or logical links, and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources can include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources can be used to support virtual networks, virtual machines (VM), databases, applications (Apps), etc.

Cloud computing resources can include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner Cloud computing resources can also be provisioned via virtual networks in an overlay network, such as a VXLAN.

Figure 3:
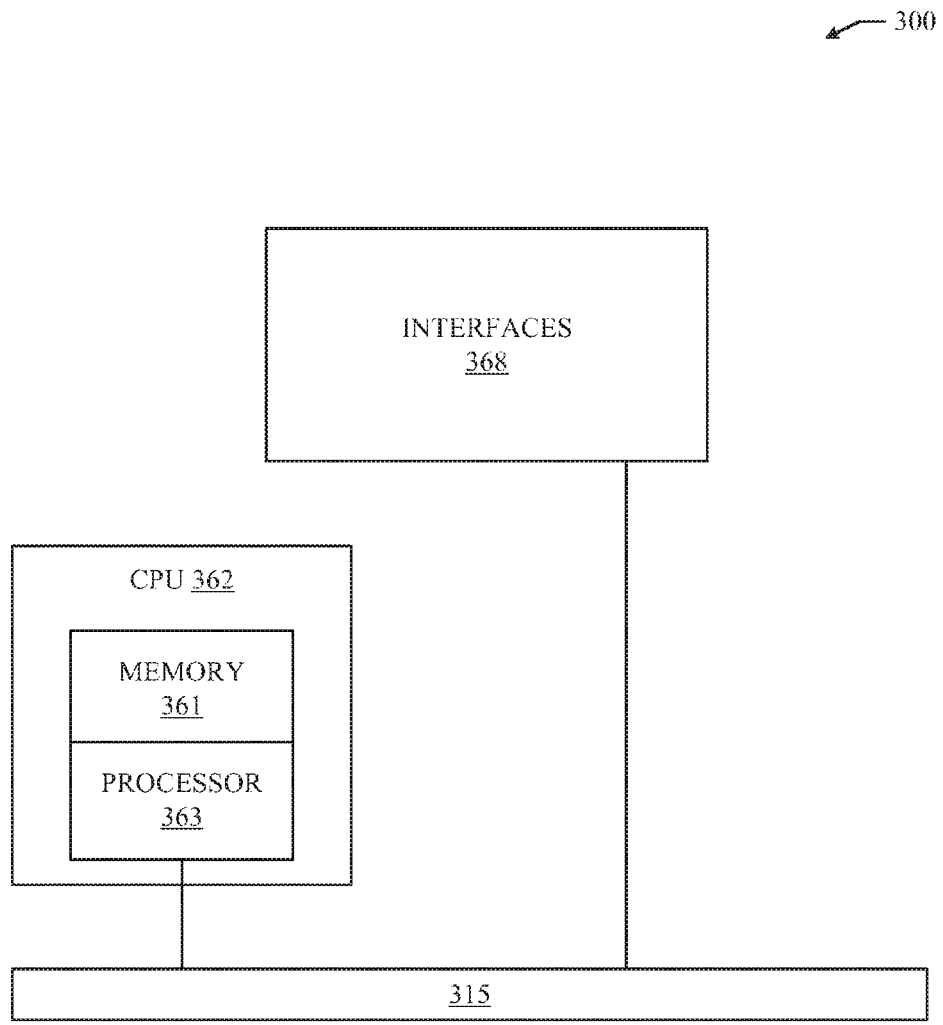
FIG. 3 illustrates an exemplary computing device in accordance with various implementations of the technology.
Figure 4:
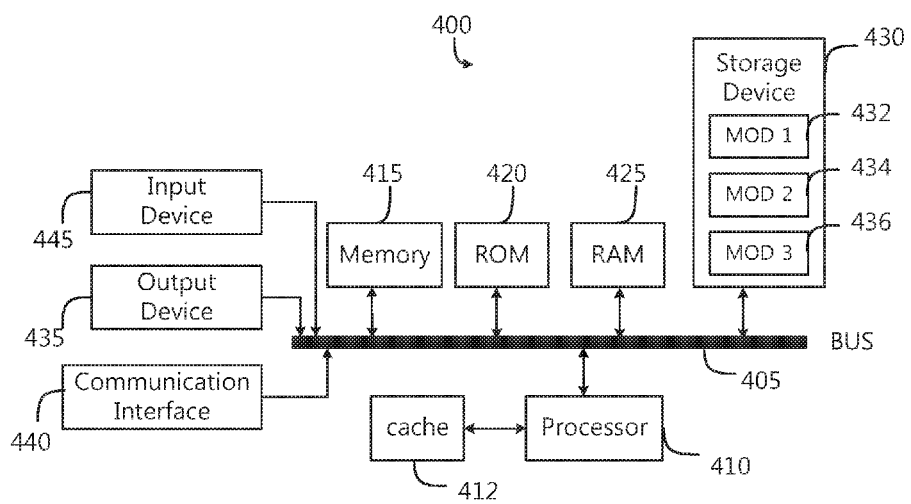
FIGS. 4 and 5 illustrate exemplary systems in accordance with various examples of the present technology.

In a network switch system, a lookup database can be maintained to keep track of routes between a number of end points attached to the switch system. However, end points can have various configurations and are associated with numerous tenants. These end-points can have various types of identifiers, e.g., IPv4, IPv6, or Layer-2. The lookup database has to be configured in different modes to handle different types of end-point identifiers. Some capacity of the lookup database is carved out to deal with different address types of incoming packets. Further, the lookup database on the network switch system is typically limited by 1K virtual routing and forwarding (VRFs). Therefore, an improved lookup algorithm is desired to handle various types of end-point identifiers. The disclosed technology addresses the need in the art for address lookups in a telecommunications network. Disclosed are systems, methods, and computer-readable storage media for unifying various types of end-point identifiers by mapping end-point identifiers to a uniform space and allowing different forms of lookups to be uniformly handled. A brief introductory description of example systems and networks, as illustrated in FIGS. 3 and 4, is disclosed herein. These variations shall be described herein as the various examples are set forth. The technology now turns to FIG. 3.

FIG. 3 illustrates an example computing device 300 suitable for implementing the present technology. Computing device 300 includes a master central processing unit (CPU) 362, interfaces 368, and a bus 315 (e.g., a PCI bus). When acting under the control of appropriate software or firmware, the CPU 362 is responsible for executing packet management, error detection, and/or routing functions, such as miscabling detection functions, for example. The CPU 362 preferably accomplishes all these functions under the control of software including an operating system and any appropriate applications software. CPU 362 can include one or more processors 363 such as a processor from the Motorola family of microprocessors or the MIPS family of microprocessors. In an alternative example, processor 363 is specially designed hardware for controlling the operations of the computing device 300. In a specific example, a memory 361 (such as non-volatile RAM and/or ROM) also forms part of CPU 362. However, there are many different ways in which memory could be coupled to the system.

The interfaces 368 are typically provided as interface cards (sometimes referred to as "line cards"). Generally, they control the sending and receiving of data packets over the network and sometimes support other peripherals used with the computing device 300. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces can include ports appropriate for communication with the appropriate media. In some cases, they can also include an independent processor and, in some instances, volatile RAM. The independent processors can control such communications intensive tasks as packet switching, media control and management. By providing separate processors for the communications intensive tasks, these interfaces allow the master microprocessor 362 to efficiently perform routing computations, network diagnostics, security functions, etc.

Although the system shown in FIG. 3 is one specific computing device of the present technology, it is by no means the only network device architecture on which the present patent application can be implemented. For example, an architecture having a single processor that handles communications as well as routing computations, etc. is often used. Further, other types of interfaces and media could also be used with the router.

Regardless of the network device's configuration, it can employ one or more memories or memory modules (including memory 361) configured to store program instructions for the general-purpose network operations and mechanisms for roaming, route optimization and routing functions described herein. The program instructions can control the operation of an operating system and/or one or more applications, for example. The memory or memories can also be configured to store tables such as mobility binding, registration, and association tables, etc.

FIG. 4A, and FIG. 4B illustrate example possible systems in accordance with various aspects of the present technology. The more appropriate example will be apparent to those of ordinary skill in the art when practicing the present technology. Persons of ordinary skill in the art will also readily appreciate that other system examples are possible.

FIG. 4 illustrates a conventional system bus computing system architecture 400 wherein the components of the system are in electrical communication with each other using a bus 405. Example system 400 includes a processing unit (CPU or processor) 410 and a system bus 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 can be available for use as well. The memory 415 can include multiple different types of memory with different performance characteristics. The processor 410 can include any general purpose processor and a hardware module or software module, such as module 432, module 434, and module 436 stored in storage device 430, configured to control the processor 410 as well as a special-purpose processor where software instructions are incorporated into the actual processor design. The processor 410 can essentially be a completely self-contained computing system, containing multiple cores or processors, a bus, memory controller, cache, etc. A multi-core processor can be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing device 400. The communications interface 440 can generally govern and manage the user input and system output. There is no restriction on operating on any particular hardware arrangement and therefore the basic features here can easily be substituted for improved hardware or firmware arrangements as they are developed. Any features or steps in any example of this patent application may be mixed with any other features or steps in any other examples.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include software modules 432, 434, 436 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, output device 435 (e.g., a display), and so forth, to carry out the function.

Figure 5:
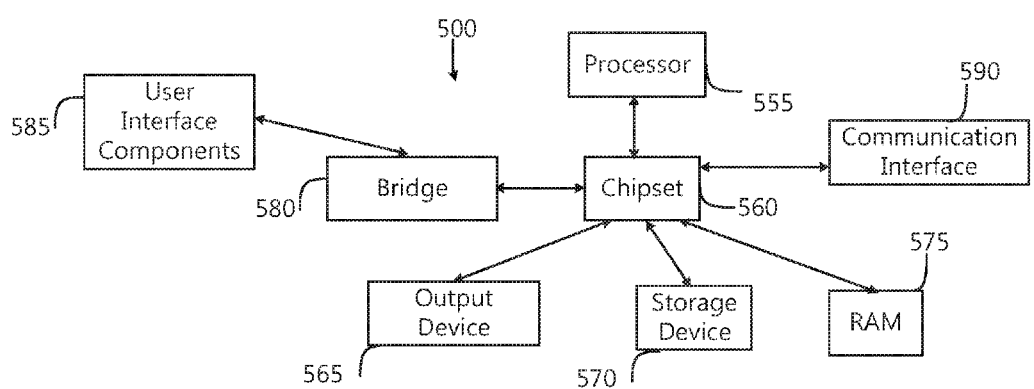

FIG. 5 illustrates a computer system 500 having a chipset architecture that can be used in executing the described method and generating and displaying a graphical user interface (GUI). Computer system 500 is an example of computer hardware, software, and firmware that can be used to implement the disclosed technology. System 500 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output device 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 500 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or RAM 575. Further, the machine can receive inputs from a user via user interface components 585 and execute appropriate functions, such as browsing functions by interpreting these inputs using processor 555.

It can be appreciated that example systems 400 and 500 can have more than one processor 410 or be part of a group or cluster of computing devices networked together to provide greater processing capability.

For clarity of explanation, in some instances the present technology can be presented as including individual functional blocks including functional blocks comprising devices, device components, steps or routines in a method embodied in software, or combinations of hardware and software.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Various aspects of the present technology provide systems and methods for remotely controlling zone management of a storage subsystem. While specific examples have been cited above showing how the optional operation can be employed in different instructions, other examples can incorporate the optional operation into different instructions. For clarity of explanation, in some instances the present technology can be presented as including individual functional blocks including functional blocks comprising devices, device components, steps or routines in a method embodied in software, or combinations of hardware and software.

The various examples can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

To the extent examples, or portions thereof, are implemented in hardware, the present patent application can be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network and any combination thereof.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these technology can comprise hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

In examples utilizing a Web server, the Web server can run any of a variety of server or mid-tier applications, including HTTP servers, FTP servers, CGI servers, data servers, Java servers and business application servers. The server(s) can also be capable of executing programs or scripts in response requests from user devices, such as by executing one or more Web applications that can be implemented as one or more scripts or programs written in any programming language, such as Java®, C, C# or C++ or any scripting language, such as Perl, Python or TCL, as well as combinations thereof. The server(s) can also include database servers, including without limitation those commercially available from open market.

The server farm can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system can also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate examples can have numerous variations from that described above. For example, customized hardware might also be used and/or particular elements might be implemented in hardware, software (including portable software, such as applets) or both. Further, connection to other computing devices such as network input/output devices can be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EPROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the technology and teachings provided herein, a person of ordinary skill in the art will appreciate other ways and/or methods to implement the various aspects of the present technology.

The specification and drawings are, accordingly, to be regarded in an illustrative rather than a restrictive sense. It will, however, be evident that various modifications and changes can be made thereunto without departing from the broader spirit and scope of the patent application as set forth in the claims.

What is claimed is:

1. A computer-implemented method for a data storage system, comprising:
    generating and initializing a network service of the data storage system for a remote device;
    generating a new thread to handle at least one command from the remote device;
    receiving a first zoning command associated with storage devices of the data storage system from the remote device;
    determining, for each port of a plurality of ports associated with the storage devices, a corresponding zone group from a plurality of zone groups, based at least upon zone IDs of the plurality of ports;
    setting a zoning configuration parameter corresponding to each zone group of the plurality of zone groups using a serial protocol;
    configuring, by a controller of the data storage system, a zone and port mapping table based at least upon the zoning configuration parameter; and
    performing, by the controller of the data storage system, hardware and memory initiation for the data storage system based at least upon the zone and port mapping table and the zone permission table.

2. The computer-implemented method of claim 1, further comprising:
    in response to determining that the first zoning command is not supported by the data storage system, receiving a second zoning command associated with the storage devices of the data storage system to yield the first zoning command.

3. The computer-implemented method of claim 1, wherein the configuring the zone and port mapping table further comprises:
    configuring mapping between a first port associated with the storage devices and a corresponding zone group; and
    in response to determining that the mapping between the plurality of ports and the plurality of zone groups is completed, writing the zone and port mapping table using the serial protocol.

4. The computer-implemented method of claim 1, wherein the configuring the zone permission table further comprises:
    configuring a zone permission for each of the plurality of zone groups; and
    in response to determining that the zone permission is configured for each of the plurality of zone groups, writing the zone permission table using the serial protocol.

5. The computer-implemented method of claim 1, wherein the network service comprises a virtual terminal connection between the remote device and the data storage system, the virtual terminal connection generated via an application layer protocol.

6. The computer-implemented method of claim 5, wherein the application layer protocol is a Telnet protocol.

7. The computer-implemented method of claim 1, wherein the receiving the first zoning command comprises receiving the first zoning command on a command-line interface (CLI).

8. The computer-implemented method of claim 6, wherein the CLI comprises at least one of a digital command language (DCL) interface, Unix shell, control program interface for microcomputers (CP/M), command com interface, cmd.exe interface, or resource time sharing system (RSTS) interface.

9. The computer-implemented method of claim 8, wherein the zone IDs of the plurality of ports are received from the remote device via the CLI.

10. The computer-implemented method of claim 9, further comprising:
    in response to determining that the first zoning command is not supported by the data storage system, providing an option for the remote device to replace the CLI with a new CLI.

11. The computer-implemented method of claim 10, wherein the option comprises a 4DOS for a disk operating system (DOS), 40S2 for an OS/2 operating system, and take-command for a Window operating system.

12. The computer-implemented method of claim 1, wherein the data storage system is configured to prevent a server system belonging to a specific zone group of the plurality of zone groups from accessing at least one storage device of the data storage system, the at least one storage device having a port assigned to a different zone group of the plurality of zone groups.

13. A storage system, comprising:
    a hardware processor; and
    a non-transitory computer-readable medium storing instructions that, when executed by the processor, cause the storage system to perform operations comprising:

generating and initializing a network service for a remote device;
generating a new thread to handle at least one command from the remote device;
receiving a first zoning command associated with storage devices of the storage system from the remote device;
determining, for each port of a plurality of ports associated with the storage devices, a corresponding zone group from a plurality of zone groups, based at least upon zone IDs of the plurality of ports;
setting a zoning configuration parameter corresponding to each zone group of the plurality of zone groups using a serial protocol;
configuring a zone and port mapping table based at least upon the zoning configuration parameter;
configuring a zone permission table based at least upon the zoning configuration parameter; and
performing hardware and memory initiation for the storage system based at least upon the zone and port mapping table and the zone permission table.

14. The storage system of claim 13, wherein the serial protocol is a SAS management protocol (SMP).

15. The storage system of claim 13, wherein the instructions, when executed by the processor, cause the storage system to perform operations comprising:
    in response to determining that the first zoning command is not supported by the storage system, receiving a second zoning command associated with the storage devices of the storage system to yield the first zoning command.

16. The storage system of claim 13, wherein the configuring the zone and port mapping table comprises:
    configuring mapping between a first port associated with the storage devices and a corresponding zone group; and
    in response to determining that the mapping between the plurality of ports and the plurality of zone groups is completed, writing the zone and port mapping table using the serial protocol.

17. The storage system of claim 13, wherein the configuring the zone permission table comprises:
    configuring a zone permission for each of the plurality of zone groups; and
    in response to determining that the zone permission is configured for each of the plurality of zone groups, writing the zone permission table using the serial protocol.

18. The storage system of claim 13, wherein the network service comprises a virtual terminal connection between the remote device and the storage system, the virtual terminal connection generated via an application layer protocol.

19. The storage system of claim 18, wherein the application layer protocol is a Telnet protocol.

20. The storage system of claim 13, wherein the receiving the first zoning command comprises:
    receiving the first zoning command on a command-line interface (CLI), wherein the CLI comprises at least one of a digital command language (DCL) interface, Unix shell, control program interface for microcomputers (CP/M), command com interface, cmd.exe interface, or resource time sharing system (RSTS) interface.

* * * * *